FIGURE 4
TRACTION COMPONENTS COMPRISING SATURATED GEM-STRUCTURED HYDROCARBONS HAVING POLAR SUBSTITUENTS

United States Patent Office 3,715,313
Patented Feb. 6, 1973

3,715,313
TRACTION TRANSMISSION CONTAINING LUBRICANT COMPRISING GEM-STRUCTURED POLAR COMPOUND
Marcus W. Haseltine, Jr., Brookhaven, and Gary L. Driscoll, Boothwyn, Pa., assignors to Sun Oil Company of Pennsylvania, Philadelphia, Pa.
Filed May 17, 1971, Ser. No. 144,165
Int. Cl. C10m 1/20
U.S. Cl. 252—52
10 Claims

ABSTRACT OF THE DISCLOSURE

Polar compounds containing a gem-structured hydrocarbon "backbone" are useful as traction fluids or as components of traction fluids. For example, compositions, useful as additives to lubricants (e.g., components of traction fluids), are produced by ozonolysis of polyolefins, particularly of polyisobutylene oligimers containing at least one pair of maximally crowded geminal methyl groups. For example, ozonolysis of the novel polyisobutylenes can produce oxygenated derivatives (ketones, esters, acids, aldehydes, alcohols, etc.) which are useful as components of traction fluids. One such alcohol is 1,1,3,3,5,5,7,7-octamethyl-1-octanol. Other compounds are 4,4,6,6,8,8-hexamethyl - 2 - nonanone and 2,2,6,6,8,8-hexamethyl-4-nonanone. Blends of the ketones or of mixtures of the acids and ketones with a base oil (e.g., paraffinic lube, naphthenic lube, a hydrogenated naphthenic or paraffinic lube, polyolefins or hydrogenated polyolefins) are especially useful as traction fluids or as a lubricant for a friction drive or a limited slip differential.

CROSS REFERENCE TO RELATED APPLICATIONS

In commonly-owned copending application Ser. No. 52,301, filed July 6, 1970, of Gary L. Driscoll, Irl N. Duling and David S. Gates, novel polyolefin and hydrogenated polyolefin oils are described which are useful as traction fluids, or as components of traction fluids. In particular, said application discloses oils consisting essentially of isobutene oligimers in the $C_{12}$–$C_{48}$ carbon number range. The novel polyolefin oils or the individual olefins therein are also disclosed as being useful as chemical intermediates to prepare novel polar components (such as alcohols, acids, esters, ketones, thioketones, amides, amines, thioesters, phosphate esters of the alcohols and thioesters). A process for separation of the individual olefins from the novel polyolefin oils, and the structural characterization thereof, is disclosed in Ser. No. 52,300, filed July 6, 1970 of Driscoll, Duling, Gates and Warren and titled Branched Hydrocarbons in the $C_{16}$–$C_{40}$ Range Having Maximally Crowded Geminal Methyl Groups. The ketones, and other non-acidic ozonolysis products are disclosed as being useful as traction fluids or as components of traction fluids. Said application also contains a declaration that such derivative, and their use as traction fluids or as antiwear additives in lubricants are the invention of Gary L. Driscoll and Marcus W. Haseltine, Jr., the present applicants.

Said application further declares that the processes for preparation of said ozonolysis products are the invention of Gary L. Driscoll. One such process, disclosed in said application, involves mixing the polyolefin oil with about 3 volumes of acetic acid or methanol and adding ozone thereto. The reaction can be effected in the range of 80–100° C. (preferably 0–80° C.). The amount of ozone can be about one molecule of ozone per each double bond in the oil. After reaction of the double bond with the ozone, an excess of water or hydrogen peroxide is added to hydrolyze the ozonolysis products. About one volume of water per volume of oil is sufficient to produce a mixture comprising acids and ketones.

In our application Ser. No. 135,295, Apr. 19, 1971, titled "Chemical Reaction Products of Polyisobutylene," we disclose the production of a large number of gem-structed polar compounds having a "true" polyisobutylene backbone, and which can be useful in practice of the present invention.

Traction drives, lubricants therefor (including lubricant additives), and methods of measuring the coefficient of traction can be found, for example, in Ser. No. 679,834, filed Nov. 1, 1967, of Duling, Gates and Haseltine, Jr., now U.S. 3,595,797 issued Aug. 27, 1971, the disclosure of which is hereby incorporated herein.

SUMMARY OF THE INVENTION

In general, improved traction fluids and components of traction fluids can be obtained by putting a polar group on a gem-structured hydrocarbon, preferably, the compound contains no aromatic or olefinic unsaturation. The resulting polar molecule appears to be more strongly attracted to metal surfaces (compared to the parent hydrocarbon) and thus produces higher traction. That such traction fluids exhibit high traction is unexpected since the literature (see Rounds, J. Chem. & Eng., vol. 5 (No. 4), October 1960, and included references) teaches that hydrocarbons containing polar groups on one end reduce the static and dynamic friction of mineral oils.

For example, compounds which are useful as traction fluids can be represented by the following structural formula:

wherein $n$ is an integer from 1–30 R, R' and R" are one or a combination of the following: methyl, ethyl, propyl, isopropyl, butyl, isobutyl, tert-butyl, isopentyl, cyclohexyl, kindan, hydrindan, cyclohexylindan, cyclohexyl hydrindan; and where R''' would be any of the following functional groups: ketone, acid, ester, alcohol, mercaptan, epoxy, thioester, thiolester, phosphate (including coesters), phosphite (including coesters), halide, imine, amide or amines. More than one functional group can be present in a given molecule (e.g., imine and amine).

Such polar compounds are particularly useful as tractants when added in major (e.g., 50–90 volume percent) or minor quantities (e.g., 0.1–50 volume percent) to such base oils as paraffinic lubes (preferably solvent refined and/or dewaxed), naphthenic lubes (preferably naphthenic acid free), polyolefin fluids (especially polymers of one or more $C_2$–$C_{12}$ monoolefins, e.g., see U.S. 3,595,797 and "synthetic" naphthenic lubes (e.g., see U.S. Pat. No. 3,287,259). All of the above-referred to base oils can be partially or fully hydrogenated to improve chemical and/or thermal stability and to permit longer periods of high traction under use conditions. Particularly useful lubricants comprise such a hydrogenated base oil which contains less than 5 weight percent of gel aromatic compounds and less than 10 weight percent of olefins and which also contains from 0.5–20% of a gem-structured polar compound, preferably, corresponding to the above formula.

In one embodiment, the present invention involves lubricant compositions comprising chemical compounds which can be produced by the action of various chemical reagents on the polyolefins or polyolefin oils of the aforementioned applications Ser. No. 52,300 and Ser. No. 52,301. Such compounds are useful as lubricant additives, particularly lubricants for tractive drives, friction drives and limited slip differentials. Similar reactions can be performed on other gem-substituted olefins to obtain the polar component of the present invention (e.g., see Ser. No. 134,095, filed Apr. 14, 1971 of Gary L. Driscoll and titled Polymerization of Dialkyl Vinylidene Compounds to Oils, now abandoned.

For example, one embodiment of the invention is a traction drive comprising at least two relatively rotatable members in torque transmitting relationship, the tractive surfaces of said members having disposed thereon a tractant composition containing at least one weight percent, preferably, at least 5% of an oxygen-containing chemical compound of a branched olefin hydrocarbon having 4 N carbon atoms where N is an integer from 3–30 (more preferably 5–20), said olefin hydrocarbon having the formula:

wherein $n$ is an integer from 0 to 29 inclusive (more preferably 2–10), and wherein Z is:

(A)

or (B)

$$-CH_2-C\underset{CH_3}{\overset{CH_2}{\diagup}}$$

or (C)

$$-CH=\underset{CH_3}{C}-CH_2-C(CH_3)_3$$

or (D)

$$-CH_2-\underset{\|}{C}-CH_2-C(CH_3)_3$$
$$\phantom{-CH_2-}CH_2$$

or (E)

$$-CH_2-\underset{CH_3}{C}=CH-C(CH_3)_3$$

For example, such a compound is produced when said olefin is split at the double bond to produce two fragments, each said fragment having a carboxyl group at the site of the original attachment. Other compounds can be produced by further reaction of one of said fragments, said reaction involving either further fragmentation (e.g., decarboxylation), further oxidation, or both.

Ozonolyses of the olefin is one means of producing said compositions. Various novel compounds and compositions can be produced depending upon the nature of the olefin. For example, when Z is (A), such compounds can be produced by at least one of the following reactions:

or when Z is (B), said compounds can be produced by the reaction:

or when Z is (C) such compounds can be produced by at least one of the reactions:

or when Z is (D) such compounds can be produced by the reaction:

or when Z is (E) said compound is produced by at least one of the reactions:

One class of preferred oxygen containing compounds in the present invention contain at least 11 carbon atoms (more preferred at least 15) and have the structural formula where $n$ is an integer from 0 to 29 inclusive and wherein Z' is $$-\overset{H}{C}=O \text{ or } -\overset{O}{\underset{\|}{C}}-OH \text{ or } -\underset{CH_3}{\overset{CH_3}{C}}-OH \text{ or } -CH_2-\overset{O}{\underset{\|}{C}}-CH_3$$

or

Typically, compositions can be obtained which contain 85–99 weight percent of one or a mixture of such oxygen-containing compounds having a polyisobutylene backbone.

The subsituted polybutene components of the present invention are usually liquids and have good solubility in petroleum oils. Therefore, these derivatives can be especially useful as lubricant additives or as additives to other oils, or petroleum products (such as rubber process oils, hydraulic fluids, fuels, refrigeration oils, textile machinery lubricants, coolant for a nuclear reactor, paints, etc.). By choice of the molecular weight (or viscosity) of the polyolefin starting material, the derivatives can be "tailored" to a desired viscosity or molecular weight.

BRIEF DESCRIPTION OF THE DRAWINGS

In the accompanying drawings.

The "VI Components," refer to high viscosity index base oils to which high traction components can be added to produce a bodied traction fluid having a good combination of VI and traction. The VI components of FIG. 4 are hydrogenated Oronite polybutene and "18–H." For convenience, "18–H" curve is plotted as if the Oronite had the higher VI and lower traction; however, the "18–H" has an ASTM VI of about 115, a $KV_{210}$ of 3.95 cs., and is a hydrogenated polymer of octene-1. The "hydrogenated Oronite polybutene" has an ASTM viscosity index of 77, $KV_{210}$ ° F. of 3.3 cs. and is prepared by substantially complete hydrogenation of a commercially available polybutene oil marketed under the trademark "Oronite."

It can be seen that FIGS. 3 and 4 illustrate the advantages of utilizing either major or minor amounts of gem-structured polar compounds in the lubrication of a friction or traction drive (e.g., the traction transmission of FIGS. 1 and 2).

Figure 1:
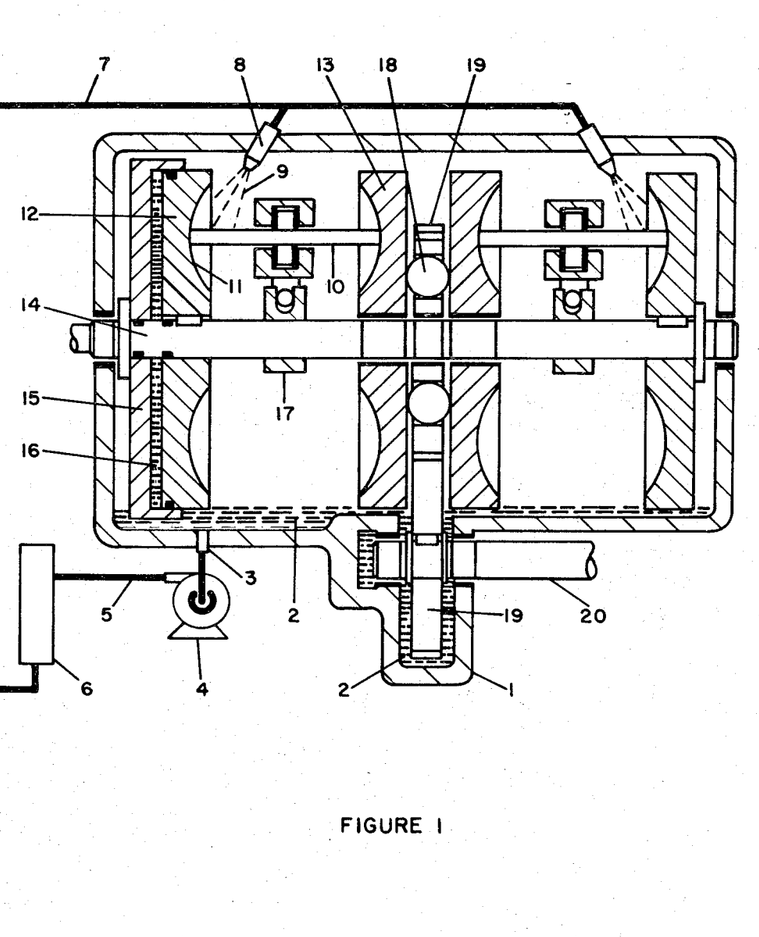
FIGS. 1 and 2 represent, respectively, a side view in cross-section and a partial front view in cross-section of a power transmission system comprising a toric traction drive transmission and, as a lubricant therefor, a composition comprising a gem-structured polar compound. For example, the lubricant can consist essentially of 40 volumes of a polyisobutene ketone (i.e., "PIB-ketone") and 60 volumes of a hydrogenated naphthenic lube containing less than 5 weight percent of gel aromatic compounds.
Figure 2:
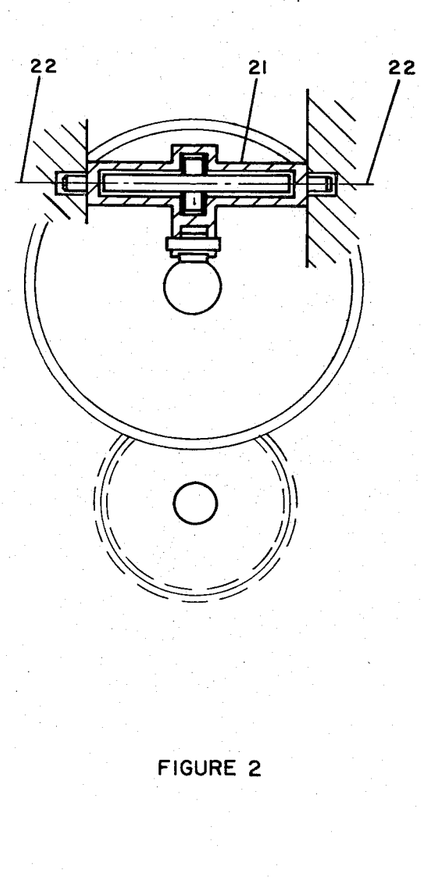
Figure 3:
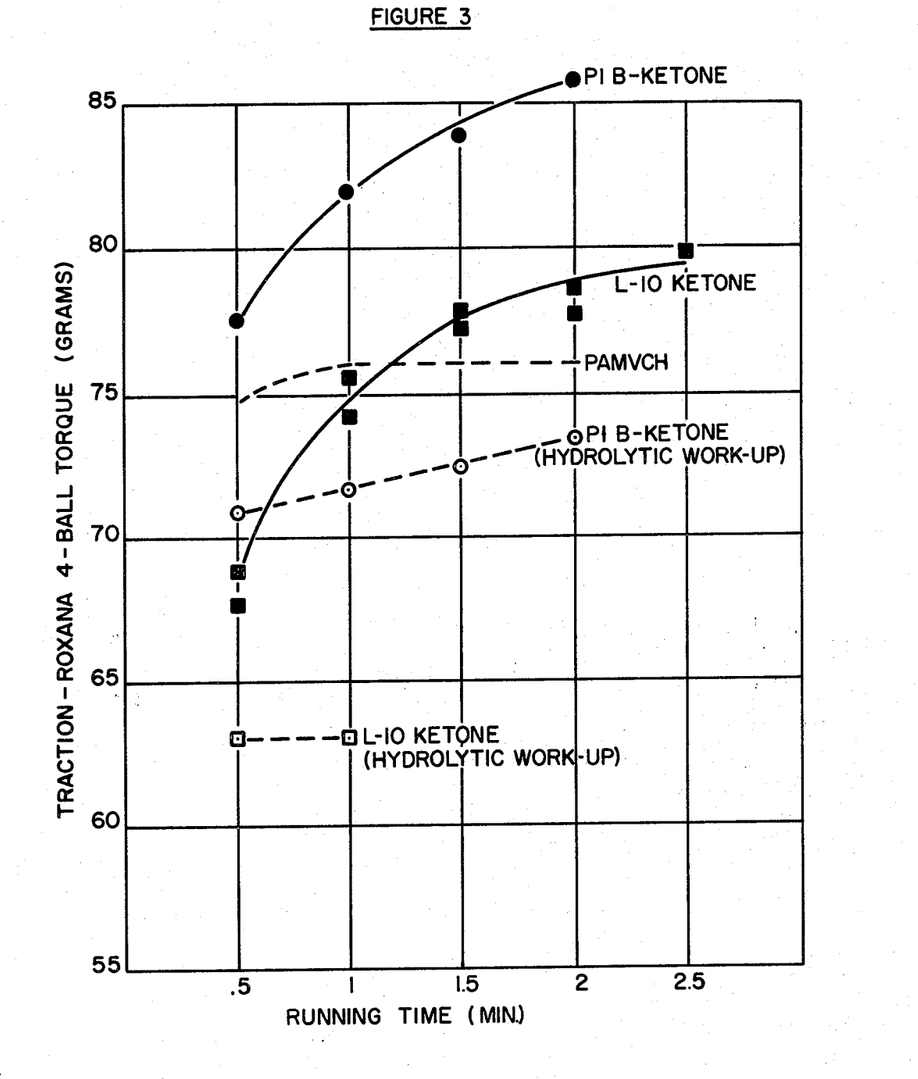
FIG. 3 is a plot of the "Running Time" versus the torque, in grams, as measured by a Roxana 4-Ball tester, for a number of polar compounds (i.e., ketones) and for a hydrogenated dimerizate of alpha methylstyrene (i.e., PAMVCH), mainly in the hydrindan form. This torque measurement is directly related to the coefficient of traction. This figure shows that a highly gem-structured polar compound (e.g., PIB-ketone) has a high initial traction coefficient and that the traction coefficient increases as the testing time (or running time) increases. This is a very favorable characteristic; since a lower torque aids in start-up, while the higher torque is more desirable when the unit is running.
Figure 4:
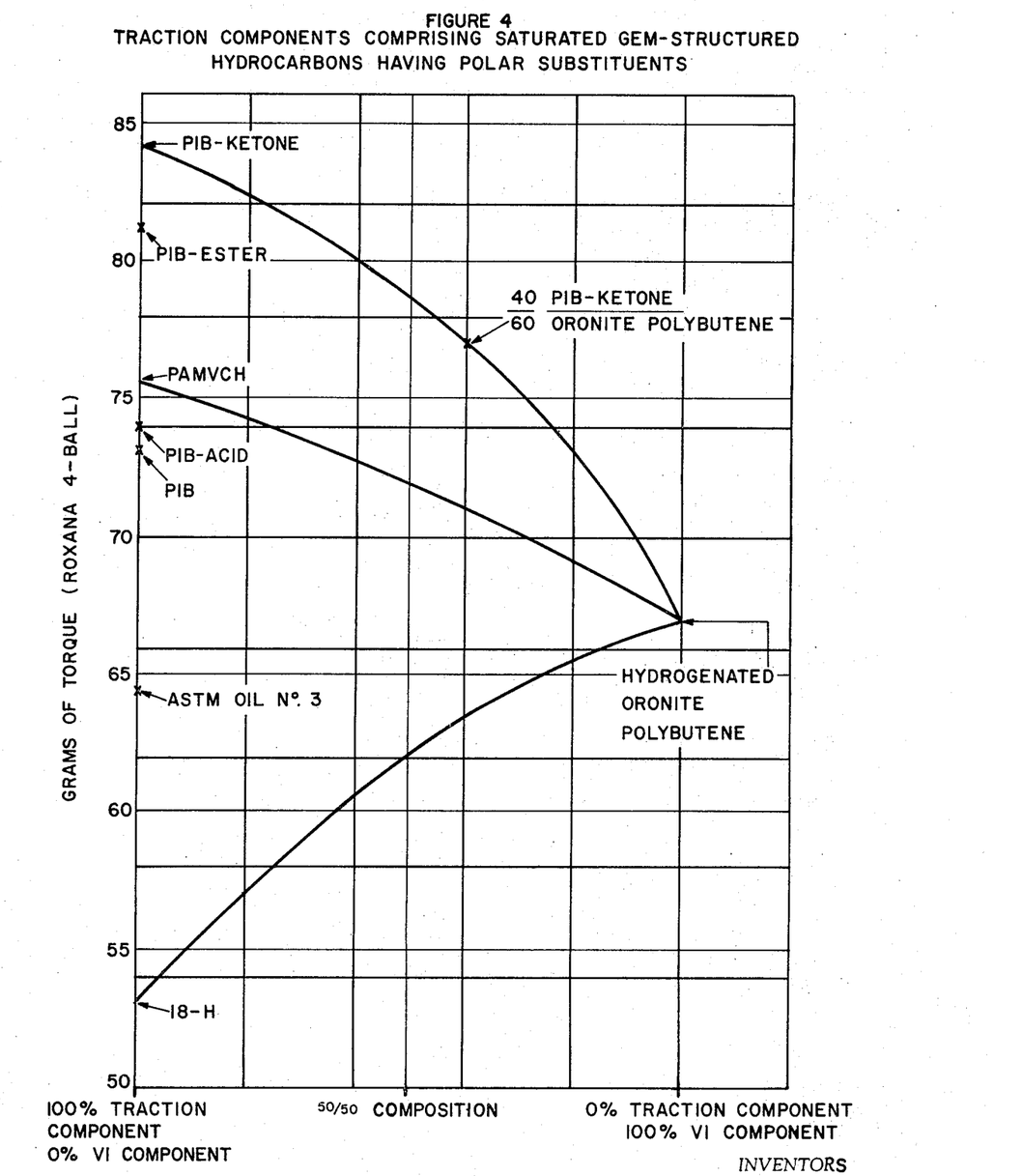
FIG. 4 is a plot of the Roxana 4-Ball torque versus the composition of various blends of "Traction Components" and "VI Components." The traction components are "true" polyisobutylene (i.e., PIB), gem-structured polar compounds containing this polyisobutylene as a "backbone" (i.e., PIB-ketone, PIB-Ester, PIB-Acid), and PAMVCH (hydrogenated dimerizate of alpha methylstyrene, hydrindan form). ASTM Oil No. 3 is shown on the curve as a reference point.

The power transmission system illustrated in FIGS. 1 and 2 is suitable as a continuous automatic variable speed power transmission for automotive use. The toric traction transmission of the figures is similar to that described in Hewko et al., "Tractive Capacity and Efficiency of Rolling Contacts," Proceedings of the Symposium on Rolling Contact Phenomena, Elsevier, Amsterdam, 1962, pp. 159–161. One example of the power transmission system of the present invention comprises a toric drive transmission, the traction fluid 2 comprising a gem-structured polar compound, means, such as a drain 3, a pump 4, and a line 5 to remove said fluid from said transmission and circulate it through a heat exchanger 6 (as an automotive-type radiator), in order that the temperature of the fluid 9 entering the transmission be kept (preferably) below 230° F. (more preferably no higher than 200° F.), and means, such as line 7 and spray nozzle 8, for returning the cooled fluid to the interior of the drive unit.

In operation of the drive unit illustrated in FIGS. 1 and 2, spheroidal steel rollers 10 running on toroidal steel braces 12 and 13 mounted on suitable shafting 14 and 20 are the principal power transmitting components. The toroidal drive in FIGS. 1 and 2 consists of two identical sections transmitting torque in parallel. Each section consists of an input race 13, an output race 12, and three rollers, only one of which, 10, can be seen in FIG. 1 Rollers of each section are spaced 120° apart and ⅙ of the input torque is transmitted by each roller. Both input faces 11 are free to rotate on the output shaft 14 whereas both output races 12 are splined to it. Contact load is applied hydraulically by the piston 15 through a hydraulic fluid 16. The double section arrangement makes the thrust force resulting from the contact load self-contained and eliminates having the ground and thrust through a high capacity thrust bearing. In FIG. 1 the surface of the roller which is in contact with the input face is shown as having the same radius of curvature as that of the face. Such a configuration presents a most difficult lubrication problem. Lubrication is greatly facilitated when the radius of curvature of the contact surface of the roller is less than the radius of curvature of the input face (see U.S. Pat. 1,867,553).

The cooled traction fluid 9, which acts as a lubricant and coolant for the drive, is supplied through one or more spray nozzles 8 which are preferably directed toward the contact area between the steel roller and the race. In one embodiment, the lubricant is applied in mist or aerosol form. For mist lubrication, the lubricant can contain, to improve reclassification and/or reduce stray mist, an effective amount (e.g., 0.01–2 wt. percent polymer) of a polymeric additive selected from one or a mixture of acrylic, methacrylic, olefin (e.g., isobutylene) and styrene (e.g., α-methylstyrene) polymers having a viscosity average molecular weight in the range of 10,000–2,000,000 (preferably 100,000 to 500,000). Such additives are described in the commonly-owned copending application of Amoroso et al. titled "Mist Lubricant Containing Polymeric Additive" and filed on or about May 4, 1971, the disclosure of which is incorporated herein by reference. Of the above noted polar additives the more preferred are the polyolefins and the polar polyolefins (e.g., poly(methyl methacrylate)).

Circulation of the lubricant throughout the drive unit can be accomplished by mist lubrication or by splash effect. That is, the bottom section of the casing which houses the differential driver gear 19 can act as a sump for fluid which is circulated to the differential ball bearings 18 as the gear rotates.

A change in ratio is accomplished by tilting all rollers about an axis 22 and thus changing the effective radii of the input and output races. Tilting of the rollers can be accomplished by inclining the rollers through some angle about an axis through the race contacts, thus, steering the rollers into the desired ratio positions. The ratio between the two sections is kept constant by locking the two synchronizing collars 17 in a position that makes the speeds of both input races identical. The input races are driven through a ball differential 18 by the differential driver gear 19 mounted on the input shaft 20. This arrangement equalizes the torque between the two sections and permits both the input and output shafts to have the same direction of rotation.

It can be seen that an important requirement of a traction fluid for use in such an automotive transmission system is that it not only have good traction properties, but also be a good lubricant for the differential gear and differential ball, and a good lubricant for the rollers and races. Although such a traction fluid could also be used as the hydraulic fluid 16 in the unit, if a hydraulic fluid of low traction (e.g., high V.I.) is used, it is preferred that the hydraulic fluid contain an indicator means, such as a distinctive dye, so that leakage of the hydraulic fluid into the main body of the drive unit can be detected by inspection of the main body of traction fluid, such as by a dip-stick arrangement.

To prevent loss of fluid by vaporization and to insure against introduction of contaminants into the fluid, the transmission system should be fully enclosed and well sealed. With the more volatile fluids, the seals and system should be capable of withstanding pressure exerted by the vaporized portion of the fluid at operating temperatures.

ILLUSTRATIVE EXAMPLES
EXAMPLE 1

A three-necked, one-liter, round-bottomed flask was equipped with a mechanical stirrer, a gas inlet tube (which also serves for intermittent product removal), and a reflux condenser containing a thermometer which dipped into the liquid layer and was capped with a gas exit tube leading through a mercury bubbler to the atmosphere. Nitromethane (200 ml.) and stannic chloride (5 ml.=11.15 g.) were added to the flask and the isobutylene flow started. The reaction was maintained at $3 \pm 1°$ C. with an ice bath. The rate of isobutylene addition was 7.2 g./min. which resulted in 8.5 ml./min. of product (density ~.85) formation. At 20 min. intervals, the isobutylene feed and the stirrer were stopped and the layers permitted to separate. The top oil layer (170 ml.) was removed and the nitromethane (bottom) layer was returned to the reactor with 5 ml. (3% of product volume) fresh nitromethane added to compensate for solubility losses. After four twenty-minute runs, the reaction was stopped. The catalyst in the nitromethane layer was readily killed with water with some production of HCl fumes. No difficulty with an exotherm was encountered when killing the catalyst. The combined oil layers (665 ml. including 20 ml. nitromethane) were washed with water, with 5% sodium hydroxide solution, and twice more with water. A solvent such as pentane or heptane can be added to facilitate handling.

Although the oil of this example contains all of the novel polyisobutylene oligomers in the series $C_{16}$–$C_{20}$ ... $C_{48}^+$ fractional vacuum distillation can be used to obtain a fraction relatively pure in a given oligomer (e.g. $C_{16}$).

In the reaction of this example, small amounts of water in the catalyst and/or feed material can act as a reaction promoter. If extremely pure materials are used in the process, a small amount of water can be added to initiate or hasten the reaction. A lower alcohol (e.g., methanol) or acid (e.g., acetic acid) can also be used as such a promoter. Generally, the reaction rate can be increased (over anhydrous) by addition of 0.1–1.5 moles $H_2O$ per mole of $SnCl_4$. FIG. 5 illustrates the acceleration of the polymerization rate which can be obtained by such addition of a reaction promoter.

Polyolefin products, such as that of this example, can contain residual tin and chlorine (e.g., 250–5000 p.p.m. Cl). As is discussed in more detail hereinafter, these elements, particularly the tin, can be present as a metalorganic compound which imparts EP (extreme pressure lubricant) properties to the product. However, if one desires, the chlorine (e.g., 2000 p.p.m.) can be removed from the product by heating the product with calcium oxide (lime) followed by filtration. Mild catalytic hydrogen treatment (e.g., 200 p.s.i. of $H_2$, 200° C., Harshaw NI–0104P catalyst) can also be used to reduce the tin and chlorine content to very low levels (e.g., Cl from 2000 p.p.m. to 6 p.p.m.).

The process of the present example can also be used to convert butadiene to trans-1,4- and 1,2-polybutadienes. This is surprising since prior art cationic catalyst systems convert butadiene to cyclized polymers.

1-decene can also be polymerized with the catalyst system of the present example, if $AlCl_3$ is substituted for $SnCl_4$, particularly to get high yields of a low viscosity oil. Oxygenated derivatives of these poly 1-decenes can be obtained by ozonolysis in a similar manner to the process of the next example.

EXAMPLE 2

Polyisobutylene oil from Example 1 (260 ml., 221.4 g.) and anhydrous methanol (800 ml.) were placed in a three-necked, two-liter, round-bottomed flask equipped with a gas inlet tube, a mechanical stirrer, and a reflux condenser. The flask was maintained at about 0° C. by means of an ice bath while an oxygen-ozone stream (5.2 millimoles $O_3$ per minute) was passed through for 150 minutes. After this time the product was given a "hydrolytic work-up." Distilled water (300 ml.) was added and the mixture heated to reflux for 90 minutes. The oil layer was diluted with pentane (500 ml.) and successively extracted with about 250 ml. of water (twice); 5% ferrous sulfate solution; 5% sodium carbonate solution; water; 5% sodium carbonate solution; and water (twice).

The combined sodium carbonate and water extracts were acidified with concentrated hydrochloric acid and extracted with ether. After drying, the ether was removed to recover 8 g. (3.6%) of an acidic fraction.

The main pentane layer was dried over calcium chloride and the pentane removed on a steam bath to recover 194 g. (87.6% by weight) of a neutral fraction. The infrared spectral analysis of this material showed that it contained mainly carbonyl (aldehyde or ketone) functionality with smaller amounts of hydroxyl functionality. Analysis by gas-liquid chromatography showed that the composition of the product was essentially a repeating pattern of three major components in a given molecular weight range. It is possible that other components were not separated using 6' silicone oil columns and 6' polyethylene glycol columns. Several minor components were also detected. Very little unreacted oil was present. This product will be referred to sometimes hereinafter as "PIB-ketone" or "PIB-ketone, hydrolytic work-up."

EXAMPLE 3

The neutral product (PIB-ketone) of Example 2 was tested for its traction using a modified Roxana Four-Ball Tester. It showed a traction higher than the original polyisobutylene (about 85 g. of torque versus about 72 g. initially) and higher than for commercially available polybutenes (about 66 g. of torque). This indicates that the product is useful as a traction fluid or as a component of a traction fluid.

EXAMPLE 4

The PIB-ketone of Example 2 was distilled under vacuum and separated into several fractions. One of these fractions was collected over the range of 80° C. to 110° C. at 0.8 mm. Hg pressure. This fraction contained relatively few components. The individual components were isolated by gas-liquid chromatography and characterized by means of infrared, mass, and nuclear magnetic resonance spectral data. The predominant component was 4,4,6,6,8,8-hexamethyl-2-nonanone. The two lesser components were identified as 1,1,3,3,5,5,7,7-octamethyl-1-octanol and 2,2,6,6,8,8-hexamethyl-4-nonanone.

The structural formulae of higher boiling fractions correspond to the above structures with an additional appropriate number (e.g., up to a total carbon number of at least about 49 for the ketones and at least about 50 for the alcohols) of units inserted after the first t-butyl group. The "PIB-ketone" is, therefore, a mixture containing predominantly ketones (at least about 75 mole percent).

EXAMPLE 5

The neutral product (50 g.) of Example 2 was dissolved in 200 ml. of diethyl ether and reacted with an excess of lithium aluminum hydride (8.0 g.) for four hours at reflux. The excess hydride was decomposed by reaction with ethyl acetate and 200 ml. of 15% hydrochloric acid was added cautiously. The ether layer was extracted twice with 250 ml. of water, dried over calcium chloride and the ether removed on a steam bath. The oily product (48 g., 96% by weight) was characterized as an alcohol by its infrared spectrum. No carbonyl absorption remained. Its gas-liquid chromatogram showed a repetition of two major peaks, the components having the same molecular weight no longer being separated by this column (6 feet of silicone rubber).

The alcohols which contain a large non-polar portion and a very polar alcohol portion are referred to sometimes hereinafter as "PIB-alcohol" and are useful as solvents and especially as components of traction fluids and as components in solvents for polymers such as polystyrene and polymethylmethacrylate. They are also useful as intermediates in the preparation of the corresponding acetate esters.

EXAMPLE 6

The alcohols of Example 5 (20 g.) were mixed with an excess (30 ml.) of acetic anhydride and heated on a steam bath for one hour. Excess water (100 ml.) was added to decompose the excess acetic anhydride. The mixture was heated for an additional hour. Ether (100 ml.) was added and the ether layer separated. The ether layer was extracted twice with approximately 100 ml. portions of water and then dried over calcium chloride. After the ether was removed, an infrared spectrum was obtained on the remaining 20 g. (100% by weight) of oil. The infrared spectrum showed the presence of carbonyl groups (ester) and the substantial absence of hydroxyl groups (alcohol). This ester was useful as a traction fluid, both alone and in blends (as with hydrogenated polyolefin oils or hydrogenated paraffinic or naphthenic lubes or with synthetic naphthenes or adamantanes). The ester is also useful as a component of a gear lube, especially a lubricant for a limited slip differential. Typically blended fluids or lubes can contain in the range of 1–95% of such an ester and 99–5% of one or a mixture of oils of the paraffinic, naphthenic or polyolefin classes (such oils can be partially or fully hydrogenated).

EXAMPLE 7

A solution was prepared in a two-liter flask by mixing hydroxylamine hydrochloride (100 g.), water (600 ml.), 10% sodium hydroxide solution (400 ml.), and ethanol (400 ml.). This mixture was stirred while the neutral ketone product (40 ml., 34 g.) prepared according to Example 2 was added. The resulting mixture was heated and stirred at 80° C. for 30 minutes. The entire mixture was diluted with 1000 ml. water and extracted with 500 ml. ethyl ether. The ether layer was extracted twice more with 500 ml. portions of water. The ether layer was dried over calcium chloride and the ether removed on a steam bath. The resulting oil (28 g. 82.4% by weight) was found by infrared spectroscopy to contain oxime functions and substantially no unreacted carbonyl functionality. This oxime is soluble in paraffinic and naphthenic petroleum oils and is useful as a traction component or as a viscosity stabilizer for oil-extended unvulcanized rubber stock.

EXAMPLE 8

A three-liter, round-bottomed flask was equipped with a gas inlet tube, a mechanical stirrer, and a reflux condenser. This was charged with acetic acid (1500 ml.) and polyisobutylene oil (500 ml.) prepared according to Example 1. An oxygen-ozone stream (5 liters per minute, 5.3 millimoles ozone per minute) was passed through the mixture for 240 minutes. The temperature was maintained in the range of 25–50° C. by means of a water bath. The reaction mixture was initially two phases, but became homogeneous near the end of the reaction time.

The crude mixture was then given an "oxidative workup," that is, it was heated to 90–100° C. and 30% hydrogen peroxide solution (500 ml.) was added cautiously over a period of 50 minutes. The mixture was then refluxed (ca. 110° C.) for six hours. Ether (1000 ml.) and water (150 ml.) were added and the layers separated after stirring. The ether layer was washed twice with water and twice with .2% ferrous sulfate solution (500 ml. each). The ether layer as next washed with 10% sodium carbonate solution (500 ml.) and twice with water (1000 ml. each time). Since the sodium salt of the acid is much more soluble in water than in sodium carbonate solution, most of the separation occurs in the two water washes. The remaining ether layer was dried over calcium chloride and the ether removed on a steam bath to give the neutral ketonic fraction. Gas-liquid chromatography and infrared spectroscopy indicated that the product was similar to the product of Example 2, but more complex and showing indications of significant isomerizations. This neutral fraction amounted to 232 g. (55.0% by weight) and is hereinafter sometimes referred to as "PIB-ketone, oxidative work-up."

The sodium carbonate extract and the two following water extracts were combined and made acidic by cautious addition of excess hydrochloric acid and extracted with diethyl ether (500 ml.). The ether layer was dried over calcium chloride and the ether removed on a steam bath. The resulting liquid acid fraction weighed 134 g. (32.3% by weight) and is hereinafter referred to sometimes as "PIB-acid." The infrared spectrum showed the absorbance bands characteristic of carboxylic acid functions.

10% PIB-ketone in hydrogenated "Sunvis 11" (a solvent refined paraffinic lube) yields a torque transmission of 67 grams compared to 58 grams for the hydrogenated Sunvis 11 containing no additive. The "PIB-ketone, oxidative work-up" produces similar results.

Any of the polar compounds described herein perform as a traction improving additive in any petroleum oil (paraffinic or naphthenic) or any compatible synthetic fluid (silicones, ester lubes, polyolefins, fluorinated fluids).

The polar compounds can be used as extreme pressure additives and/or wear additives. The polar end of the molecule is apparently strongly attracted to the metal surface, resulting in less wear of the surface due to the protective action of the gem-structured "backbone."

EXAMPLE 9

The sodium salt of the acidic fraction can be readily obtained by proceeding according to Example 8 to the first water extraction following the 10% sodium carbonate extraction. When these two extracts were mixed, a phase separated. This can be diluted with diethyl ether and the phases separated. Drying over calcium chloride and removal of the ether on a steam bath results in a viscous liquid product which has an infrared spectrum consistent with a sodium carboxylate.

This product is useful as a detergent, as a surface active agent, and as a solubilizing agent. At least 20% diethyl ether can be dissolved in water containing a few percent of this salt.

The sodium salt can also be prepared directly from the acid and a suitable base under nearly anhydrous conditions. Salts of other metals, e.g., lithium, calcium, magnesium, barium, zinc, and cobalt, can also be prepared in a similar manner. Such salts are useful in compounding greases, hydraulic oils, lube oils, etc. Such salts (e.g., Na+) can be used to increase the viscosity and/or reduce acidity of lubricants, especially lubricants for traction or friction drives.

All samples of this sodium salt obtained to date have been liquid and contained impurities. It is not clear whether or not the salt would be a liquid if it were entirely pure. On the other hand, none of the other derivatives prepared in this series were solids.

EXAMPLE 10

The acidic fraction prepared according to Example 8 (25 ml., 22.6 g.), methanol (200 ml.), and 96% sulfuric acid (30 ml.) were placed in a 500 ml. round-bottomed flask and refluxed for 6 hours. Water (200 ml.) and diethyl ether (200 ml.) were added and the layers separated. The ether layer was successively extracted with water, 10% sodium carbonate, and water using 200 ml. each time. The ether layer was dried over calcium chloride and the ether removed on a steam bath. The resulting neutral ester produced weighed 18 g. (80% by weight) and is sometimes referred to hereinafter as "PIB-ester." Gas-liquid chromatography showed the repeating pattern to be three major components at each general molecular weight level. The repetitions were characterized by the four-carbon unit. Infrared analysis showed the absorbance expected for ester functionality and the absence of acid functionality.

The ester was useful as a traction fluid and as a component of blended traction fluids. Particularly useful blended base stock comprise 1-99 volume percent of the ester and from 99 to 1% of at least one naphthene or paraffin having an SUS viscosity at 100° F. in the range of 25-25,000.

EXAMPLE 11

An acid (1 g.) prepared according to Example 8 was mixed with thionyl chloride (1 ml.) and carefully warmed on a steam bath until the bubbling subsided. It was then heated and a nitrogen flow maintained while the thionyl chloride evaporated. Finally, a water aspirator-produced vacuum was applied to the solution which was maintained at 80-90° C. for 15 minutes. An infrared spectrum on the oil product (which had a sharp odor) showed absorbance characteristics of acyl halides.

EXAMPLE 12

The acyl halide product of Example 11 was poured into methanol (25 ml.). Water (50 ml.) and diethyl ether (50 mol) were added and the layers separated. The ether layer was extracted (once with 5% sodium carbonate (50 ml.) and twice with water (100 ml. each)). The ether layer was dried over calcium chloride and the ether removed on a steam bath. The resulting oily product was shown by gas-liquid chromatography and infrared spectroscopy to be identical with the PIB-ester of Example 10.

EXAMPLE 13

An acid (50 g.) prepared according to Example 8 and excess (20 g.) of 85% hydrazine hydrate (the remaining 15% being water) were mixed in a 250 ml. Erlenmeyer flask with magnetic stirring. The mixture immediately became warm. The temperature was then raised by external heating to 125° C. and excess hydrazine fumed off in a well-ventilated hood. The temperature was maintained at 125° C. for two hours then raised to 185-210° C. for a further two hours. An infrared spectrum of the very viscous material showed that it was substantially converted to the acyl hydrazide derivative. The product was dissolved in diethyl ether (400 ml.) and extracted twice with water (500 ml. each time). Many of these extractions resulted in serious emulsion difficulties. Such emulsions were broken with concentrated sodium chloride solution, but separation times of one to two days were still occasionally required. The ether layer was dried over calcium chloride and the ether removed on a steam bath.

The product was very viscous and light orange in color. An infrared spectrum was again determined and showed somewhat sharper bands. The material was especially characterized by absorbances near 3.1 M and 6.1 M typical of acyl hydrazides. This hydrozide was different from others because it was liquid, rather than solid and was soluble in pentane, white mineral oil, and other hydrocarbons, but insoluble in water. This is to be contrasted with the hydrazide from oleic acid, which is solid and unsoluble in oil. Adipyl dihydrazide, acetyl hydrazide, and benzoyl hydrazide are also solids which are soluble in water but insoluble in hydrocarbons. The hydrazide of this example is especially useful as a traction component, or as a viscosity stabilizer in oil-extended uncompounded synthetic rubbers because of these solubility properties. It is also useful as an emulsifying agent and as an antiozonant in rubber.

EXAMPLE 14

The acid (10 g.) prepared in Example 8 was dissolved in methanol (50 ml.) containing added water (1 mol.) Sodium borohydride (3 g.) was added in small portions over one hour. Ether (100 ml.) and water (100 ml.) were added and the layers separated. The ether layer was extracted twice more with water (100 ml. each) and the ether layer discarded. The combined water layers were cautiously acidified with concentrated hydrochloric acid and ether (100 ml.) was added. The layers were separated. The ether layer was extracted with water (100 ml.), dried over calcium chloride, and the ether removed. The resulting acid was converted to its corresponding ester by the procedures of Examples 11 and 12. Gas-liquid chromatography showed that the middle component of the three major components described in Example 8 was considerably enhanced.

Since it is well known that sodium borohydride will not reduce carboxylic acids under these conditions but will reduce esters, ketones, and aldehydes, it is reasonable to conclude that the center and largest component represents the original acidic component and the other peaks represent other carbonyl components not separated due to the previously mentioned strong solubilizing power of the sodium salt of the carboxylic acid.

EXAMPLE 15

The neutral ketone (10 g.) prepared according to Example 2 was slowly added to 85% aqueous acetic acid (100 ml.) containing chromic acid (2 g.) heated on a steam bath to around 90° C. This was left for two hours with occasional shaking. Then water (200 ml.) and ether (200 ml.) were added. The ether layer was extracted with water, 10% hydrochloric acid, 10% sodium hydroxide solution, and twice with water. It was then passed over a 3 foot x 1 inch column of chromatographic grade alumina. The ether used for this elution was removed to leave a product of a dissolved salt of chromium (III). Gas-liquid chromatographic analysis showed that the resulting product was a substantially purified form of the indicated ketone:

$x=1$–$10$ resulting from selective oxidation or complexation of the impurities.

The previously cited copending application, of Driscoll and Haseltine discloses the use of the paramagnetic complex, europium (III) 2,2,6,6-tetramethylheptanedionate [tris(dipivalomethanato) - europium(III)] (referred to hereinafter as $Eu(DPM)_3$), as an NMR shift reagent and, thus, provides a means of characterizing oxygenated compounds, such as those of Example 4 and Example 15. $Eu(DPM)_3$ can be used to produce selective proton resonance shifts which accentuate chemical shift differences between geminal methyl and between isolated methylene groups, as in the highly branched alcohols and ketones.

EXAMPLE 16

The reaction product of Example 1 contains substantial amounts of tin and chlorine. Most probably, the tin and chlorine are chemically combined, in a highly soluble and compatible form, with one or more isobutylene oligomers. In any event, the recovered polyisobutylene oil can also contain such tin and chlorine. Such a novel tin and/or chlorine containing polyisobutylene oil has improved antiwear properties (e.g. a 4-ball tester "wear-scar" in the order of 0.4–0.6 mm. compared to about 0.75 mm. for a solvent refined paraffinic lube of comparable viscosity). Chemical derivatives (such as those of the preceding Examples 2–6 and 10) can also exhibit improved antiwear properties, which can be caused in whole or in part by inclusion of such tin and chlorine or, perhaps, the improved antiwear properties may be, in whole or in part, an inherent property of said derivative.

An antiwear additive (e.g., for incorporation in conventional naphthenic distillate oils, hydrorefined lube oils, hydrocracked oils, white oils, solvent refined paraffinic lube oils or mixtures of two or more such oils) can be obtained from such reaction products (or tin and chlorine containing oils) by such means as extraction with a solvent (preferably acetone) for the presumed organo tin-chlorine complex. Preferred solvents comprise acetone, ethanol, methanol, methyl ethyl-ketone, dimethyl form-amide, sulfolane, furfural, nitromethane, nitroethane, and the like; that is, solvents which will not dissolve the oil but will dissolve the more polar complex. Readily detectable antiwear protection is provided by such additives at concentration levels which impart 100 parts of tin per million parts of oil, with a typical range being 50 p.p.m.–10 weight percent of tin. The previously mentioned copending application of Driscoll and Haseltine discloses the testing of such additives and methods of obtaining such tin-containing additives.

EXAMPLE 17

A polyisobutylene oil (33 g., about 1 mole) prepared according to Example 1 was dissolved in carbon tetrachloride (150 ml.) and bromine was added dropwise to the stirred solution. White fumes could be seen above the reactor. These fumes tested very acidic on moist indicator paper. The fumes, caused by the presence of hydrogen bromide, indicate that a substitution reaction was occurring as well as the expected addition reaction. Bromine addition was continued until the color of unreacted bromine persisted for several minutes of warming. The total amount of bromine added was about 40 grams or 2½ times the theoretical amount needed for the addition reaction. The $CCl_4$ layer was extracted twice with water, once with sodium bisulfite solution (to remove the excess bromine) and twice more with water. The $CCl_4$ was removed by heating on a steam bath to leave a light brown oil, sometimes referred to hereinafter as "PIB-bromide." Its infrared spectrum showed CH, CC and CBr functionality. The oil was a source of active halogen and was found to be useful as an anti-weld component of cutting oils. The yield was 60 grams of isolated product oil. The chloride can also be prepared by a similar reaction of the olefin with chlorine and is useful as an EP additive, particularly in lubrication of a traction or friction drive. PIB-bromide (or individual brominated polybutenes) can be reacted with diamines or other polyamines (e.g., at reflux in dimethyl formamide solvent) to form an imine-amine, those of the following structure being especially good traction fluid components:

Preferably $n$ is 2–10 (e.g. 2) and $n'$ is 1–20 (e.g. 3). A preferred polar tractant is 5,5,7,7,9,9-hexamethyl-4-azadecylamine.

Table I presents Roxana Four Ball Torque data for a number of polar compounds previously described herein.

Table II presents the structural formulae of a number of cyclic polar compounds which are useful as components of lubricants for a traction transmission or a friction drive. These components are especially useful when present in the range of about 0.5–10 weight percent in a base lubricant comprising at least one fully or partially hydrogenated oil selected from polymers of styrene (or of substituted styrene, such as α-methylstyrene), polyolefins, naphthenic and paraffinic lubes. Such polar compounds can also be used in such lubricants which also contain from 0.1–95% of the gem-structured polar compounds previously referred to herein. The use of sebacate esters (such as dioctyl sebacate or dibutyl sebacate) as polar components (in the 0.5 to 10 weight percent range) of lubricants (as those referred to above) for a traction or friction drive, is the invention of David S. Gates, Marcus W. Haseltine, Jr., and J. E. Hailstone and will be the subject of a later filed application.

The ozone treatment described in Example 2 can also be used to improve the initial and aged (with copper ASTM D1934-B) power factors of hydrorefined mineral oils, used as electrical insulation media (e.g., transformer oils, cable oils) particularly hydrorefined naphthenic oils having a SUS viscosity in the range of 40–20,000 SUS at 100° F. For example, a 2000 SUS (at 100° F.) hydrorefined (625° F., 1000 p.s.i.g. of 100% $H_2$, 0.3 LHSV, sulfided Ni, Mo oxides on $Al_2O_3$) naphthenic distillate was contacted with 0.5 wt. percent ozone to produce a dark colored oil which, after 96% $H_2SO_4$ treatment, washing, neutralizing and adsorbent contacting (to remove the dark products), produced a good cable oil. This product and process is the invention of Gary L. Driscoll and will be the subject of a later filed application.

Methods for analysis of the branched olefin and paraffin oils described herein (as in Example 1) can be found in J. Poly. Sci., part A-1, volume 9, pp. 717–745 (March 1971).

TABLE I.—ROXANA 4-BALL TESTING

| Sample designation | Running time (min.) | Traction (grams of torque) | $KV_{210}$ | $KV_{100}$ | VTF VI | Scar |
|---|---|---|---|---|---|---|
| 1. PIB (starting material) | ½<br>1 | 73.3<br>72.8<br>73.9 | 4.49 | 24.14 | 101 | Medium. |
| 2. PIB-ketone (Batch 1) (oxidative work-up) | ½<br>1 | 83.2<br>82.5<br>84.0 | 3.97 | 21.14 | 88 | Do. |
| 3. PIB-ketone (Batch 1) (oxidative work-up) | ½<br>1 | 84.4<br>83.0<br>85.8 | (See #2) | | | Do. |
| 4. PIB-ketone (Batch 1) (oxidative work-up) | ½<br>1<br>1½<br>2 | 83.8<br>82.5<br>85.2<br>85.9<br>86.9 | (See #2) | | | Do. |
| 5. PIB-ketone (Batch 2) (oxidative work-up) | ½<br>1<br>1½<br>2 | 75.9<br>73.9<br>77.8<br>82.8<br>85.5 | | | | Do. |
| 6. PIB-ketone (Batch 2) (oxidative work-up) | ½<br>1<br>1½<br>2 | 74.0<br>71.4<br>76.5<br>80.5<br>82.3 | | | | Do. |
| 7. PIB-ketone (Batch 2) (oxidative work-up) | ½<br>1<br>1½<br>2 | 77.5<br>71.5<br>83.5<br>85.5<br>89.2 | | | | Do. |
| 8. PIB-ketone (hydrolytic work-up) | ½<br>1 | 72.6<br>71.9<br>73.4 | | | | Do. |
| 9. PIB-ketone (hydrolytic work-up) | ½<br>1<br>1½<br>2 | 71.3<br>70.9<br>71.7<br>72.3<br>73.5 | | | | Slight. |
| 10. PIB-ketone (hydrolytic work-up) composite | ½<br>1<br>1½<br>2 | 74.6<br>74.5<br>74.7<br>75.2<br>75.4 | | | | Very slight. |
| 11. PIB-ketone (hydrolytic work-up) (metal catalyst) | ½<br>1<br>1½<br>2 | 74.2<br>74.2<br>74.1<br>74.9<br>75.4 | | | | Do. |
| 12. PIB-Ketone (hydrolytic work-up) (high temp.) | ½<br>1<br>1½<br>2 | 71.9<br>71.5<br>72.2<br>73.0<br>74.3 | | | | Slight. |
| 13. L-10-ketone (hydrolytic work-up) (indopol polybutene) | ½<br>1 | 63.0<br>63.0<br>62.9 | 6.86 | 57.8 | 67 | Medium. |
| 14. L-10-ketone | ½<br>1<br>1½<br>2<br>2½ | 70.8<br>67.6<br>73.9<br>77.9<br>78.5<br>79.9 | | | | Large. |
| 15. L-10-ketone | ½<br>1<br>1½<br>2 | 72.1<br>68.7<br>75.5<br>76.3<br>77.5 | (See #14) | | | Do. |
| 16. 75% PIB-(ketone/acid), 25% PIB | ½<br>1 | 75.5<br>74.8<br>76.2 | | | | Medium. |
| 17. PIB-acid | ½<br>1 | 74.0<br>73.9<br>74.2 | 17.51 | 377.9 | 25 | Slight. |
| 18. 75% PIB-alcohol, 25% PIB | ½<br>1 | 70.8<br>69.9<br>71.8 | | | | Very slight. |
| 19. PIB-ester | ½<br>1 | 81.4<br>80.6<br>82.2 | | | | Extremely slight. |
| 20. PIB-ester plus 10% K0880* | ½<br>1 | 71.7<br>71.9<br>71.6 | | | | Very slight. |
| 21. PIB-Br | ½<br>1 | 69.1<br>69.1<br>69.1 | | | | Very large. |
| 22. 40% PIB-ketone, 60% Oronite | ½<br>1 | 77.2<br>76.5<br>78.0 | | | | |
| 23. #22 plus 12% K0880 | ½<br>1 | 68.5<br>68.6<br>68.4 | | | | Slight. |
| 24. 10% PIB-ketone, 90% hyd. Sunvis 11 | ½<br>1 | 66.6<br>65.5<br>67.7 | | | | Large scar. |
| Hyd. Sunvis 11 | ½<br>1 | 57.9<br>57.7<br>58.2 | 3.99 | 20.51 | 96 | Large. |
| Oronite polybutene | ½<br>1 | 67.5<br>67.7<br>67.2 | 3.34 | 16.36 | 82 | Medium. |
| PAMVCH 6.82 | ½<br>1<br>1½<br>2 | 75.4<br>74.7<br>76.2<br>75.9<br>76.2 | 6.83 | 97.87 | −72 | Do. |

*K0880 is a typical commercial additive package for use in conventional automotive automatic transmission fluids of the "Ford" type. The package comprises additives for EP, antioxidant, antirust, dispersant, anticopper corrosion and antifoam.

TABLE II
POLAR TRACTANTS (a)

(c)

(e)

(g)

(b)

(d)

(f)

The invention claimed is:

1. In a friction or tractive drive comprising at least two relatively rotatable members in torque transmitting relationship, the improvement wherein the tractive surfaces of said members having disposed thereon a liquid tractant composition containing from 0.5–100 weight percent of at least one polar compound having the structural formula wherein $n$ is an integer from 1 to 30 and R, R', and R'' are independently selected from the group consisting of methyl, ethyl, propyl, isopropyl, butyl, isobutyl, tert-butyl, isopentyl, cyclohexyl, indan, hydrindan, cyclohexylindan and cyclohexylhydrindan and where R''' is a ketone functional group $$-(\text{alkylene})_m-\overset{\overset{\displaystyle O}{\|}}{C}-\text{alkyl}$$

where $m$ is 0 or 1

2. A friction or tractive drive according to claim 1 and wherein said polar compound is at least one ketone having the formula wherein Z' is (A)

or (B)

and wherein when Z' is (A), $n$ is an integer from 0 to 15 inclusive, and wherein when Z' is (B) $n$ is an integer from 1 to 16 inclusive.

3. A drive according to claim 2 and which contains from 5–100 weight percent of said compound.

4. A drive according to claim 1 wherein said compound is 4,4,6,6,8,8-hexamethyl-2-nonanone.

5. A drive according to claim 4 and which contains from 5–100 weight percent of said compound.

6. A drive according to claim 2 and containing from 5–100 weight percent of 4,4,6,6,8,8-hexamethyl-2-nonanone.

7. A drive according to claim 1 wherein said compound is 2,2,6,6,8,8-hexamethyl-4-nonanone.

8. A drive according to claim 2 and containing from 5–100 weight percent of 2,2,6,6,8,8-hexamethyl-4-nonanone.

9. A drive according to claim 1 and containing a hydrocarbon base stock comprising from 15–100 volume percent of at least one member from the group consisting of paraffinic oils, naphthenic oils, olefin homoplymer oils, olefin copolymer oils and said oils which have been at least partially hydrogenated.

10. A drive according to claim 2 and containing a hydrocarbon base stock comprising from 15–100 volume percent of at least one member from the group consisting of paraffinic oils, naphthenic oils, olefin homoplymer oils, olefin copolymer oils and said oils which have been at least partially hydrogenated.

References Cited
UNITED STATES PATENTS

| 3,394,603 | 7/1968 | Rounds | 74—200 |
| 3,417,020 | 12/1968 | Preuss et al. | 252—52 |
| 3,440,894 | 4/1969 | Hammann et al. | 74—200 |
| 3,597,358 | 8/1971 | Duling et al. | 252—73 |

DANIEL E. WYMAN, Primary Examiner
W. H. CANNON, Assistant Examiner

U.S. Cl. X.R.
252—73, 48.6, 49.8, 54.6